United States Patent
Lee et al.

(10) Patent No.: US 8,080,619 B2
(45) Date of Patent: *Dec. 20, 2011

(54) STYRENIC THERMOPLASTIC RESIN COMPOSITION HAVING EXCELLENT IMPACT RESISTANCE AND PAINTABILITY

(75) Inventors: Jae Won Lee, Osan-si (KR); Jin Hwan Choi, Anyang-si (KR); Jun Myung Kim, Seoul (KR); Jee Kwon Park, Anyang-si (KR)

(73) Assignee: Cheil Industries Inc., Gumi-si (KR)

( * ) Notice: Subject to any disclaimer, the term of this patent is extended or adjusted under 35 U.S.C. 154(b) by 133 days.

This patent is subject to a terminal disclaimer.

(21) Appl. No.: 12/499,340

(22) Filed: Jul. 8, 2009

(65) Prior Publication Data
US 2010/0010146 A1    Jan. 14, 2010

(30) Foreign Application Priority Data
Jul. 9, 2008    (KR) .................. 10-2008-0066746

(51) Int. Cl.
C08L 67/02 (2006.01)
C08L 63/00 (2006.01)
C08L 63/10 (2006.01)
C08L 25/08 (2006.01)

(52) U.S. Cl. ........ 525/438; 525/437; 525/445; 525/449; 525/533

(58) Field of Classification Search .......... 525/437, 525/438, 445, 449, 533
See application file for complete search history.

(56) References Cited

U.S. PATENT DOCUMENTS

| | | | |
|---|---|---|---|
| 5,310,799 A * | 5/1994 | Carson et al. | 525/176 |
| 5,523,135 A * | 6/1996 | Shiwaku et al. | 428/35.7 |
| 6,277,905 B1 | 8/2001 | Keep | |
| 7,612,131 B2 | 11/2009 | Yamada | |
| 7,919,559 B2 | 4/2011 | Park et al. | |
| 2007/0173629 A1 * | 7/2007 | Shiga et al. | 528/272 |
| 2007/0213458 A1 | 9/2007 | Topoulos | |
| 2008/0153954 A1 | 6/2008 | Arpin | |
| 2009/0012217 A1 | 1/2009 | Jung et al. | |
| 2009/0181199 A1 | 7/2009 | Agarwal et al. | |
| 2009/0318588 A1 * | 12/2009 | Kim et al. | 523/451 |

FOREIGN PATENT DOCUMENTS

| | | |
|---|---|---|
| DE | 19837701 A1 | 2/2000 |
| EP | 0489912 A1 | 6/1992 |
| JP | 1-263149 | 10/1989 |
| JP | 06-212064 | 8/1994 |
| JP | 6-248159 | 9/1994 |
| JP | 11-158358 | 6/1999 |
| JP | 2003-138135 | 5/2003 |
| JP | 2004-018793 | 1/2004 |
| JP | 2006-143955 | 6/2006 |
| KR | 159256 | 8/1998 |
| KR | 100830418 B1 | 5/2008 |

OTHER PUBLICATIONS

Machine translation of KR 100830418 B1, provided by the KIPO website (no date).*
Machine translation of JP 06-212064, provided by the JPO website (no date).*
English Abstract of KR 159256 (no date) pp. 1.
Office Action in commonly owned U.S. Appl. No. 12/477,530 dated Mar. 17, 2011, pp. 1-14.
Office Action in commonly owned U.S. Appl. No. 12/335,901 mailed Aug. 18, 2010, pp. 1-10.
Notice of Allowance in commonly owned U.S. Appl. No. 12/335,901 mailed Dec. 3, 2010, pp. 1-7.

* cited by examiner

*Primary Examiner* — Michael J Feely
(74) *Attorney, Agent, or Firm* — Summa, Additon & Ashe, P.A.

(57) ABSTRACT

A styrenic thermoplastic resin composition of the present invention comprises about 100 parts by weight of base resin comprising (A) about 10 to about 99 parts by weight of styrenic resin containing an epoxy group and (B) about 1 to about 90 parts by weight of polyester resin; and (C) about 0.1 to about 97 parts by weight of amorphous modified polyester resin, based on the total weight of the base resin. A molded article produced from the styrenic thermoplastic resin composition of the present invention can have excellent impact resistance and paintability.

17 Claims, No Drawings

STYRENIC THERMOPLASTIC RESIN COMPOSITION HAVING EXCELLENT IMPACT RESISTANCE AND PAINTABILITY

CROSS REFERENCE TO RELATED APPLICATIONS

This application claims priority from Korean Patent Application No. 2008-66746 filed on Jul. 9, 2008 in the Korean Intellectual Property Office, the disclosure of which is incorporated herein by reference in its entirety.

FIELD OF THE INVENTION

The present invention relates to a styrenic thermoplastic resin composition having excellent impact resistance and paintability.

BACKGROUND OF THE INVENTION

Acrylonitrile-butadiene-styrene copolymer resin (hereinafter 'ABS resin') is a graft-copolymer resin (hereinafter 'g-ABS') in which styrenic monomers and acrylonitrile monomers are grafted with a butadiene-based rubbery polymer dispersed in a styrene-acrylonitrile copolymer resin (hereinafter 'SAN resin') which is a matrix copolymer. ABS resin has excellent impact resistance, chemical resistance, heat resistance and mechanical strength, is readily molded, and accordingly is widely used in the manufacture of components for electric and electronic goods, interior/exterior construction materials, automobile parts, and miscellaneous goods, among other products.

A recent trend is to paint plastic molded products, such as electric and electronic goods, to improve their external appearance, polishing properties, surface-scratch resistance and weather resistance and to provide high-quality products with a luxurious appearance. As used herein, reference to painting a resin surface includes the application of paint, metal, or other coating materials using any suitable technique, including without limitation metal deposition.

Generally, the surface of the resin product is pretreated or primed prior to painting to improve adhesion of the coating material and surface appearance of the end product. For example, when ABS resin is used as a back-ramp housing material for an automobile, the surface of an ABS injection molded product is typically pretreated or primed prior to metal (such as aluminum) deposition by smoothing the surface of the injection-molded product using chemical solvents. The surface of the resin must be properly prepared to provide the desired degree of gloss after aluminum deposition.

Generally, the chemical resistant property or paintability of ABS resin can be improved by regulating the acrylonitrile content in the ABS resin. For example, increasing acrylonitrile content can prevent stress cracks caused by solvents. However, the coating film may be stripped off. On the other hand, if the acrylonitrile content is too low in the ABS resin, the external appearance of the resultant product can deteriorate due to coating corrosion by solvents, thereby requiring a double coating process. Hence, there is a need to improve paintability of the ABS resin.

Polyester resin has a short molecular chain and a structure that is not easily bent so that it has good stiffness properties, electric properties, weather resistance and heat resistance and its tensile strength is rarely decreased when exposed to high temperature for a long time. Also, the polyester resin has good tolerance to oil like diesel oil and has high dimensional stability and moldability so that it is widely used in various industrial fields such as automobile parts and electric and electronic goods, among others. Furthermore, polyester resin is suitable for use as a material for a head-ramp bezel of an automobile because molded products formed thereof can have a graceful surface, excellent polishing property and paintability, for example, excellent adhesive property with regard to vacuum deposited aluminum or chromium coating. The physical properties of polyester resin, however can easily change when the resin is exposed to acid or alkali at high temperature for a long time because of its ester bonds in the molecular chain.

SUMMARY OF THE INVENTION

The present inventors provide a thermoplastic resin composition which can have good affinity with chemical solvents and exhibit excellent paintability with a surface-treating or coating agent (such as paint, metal, and the like) without requiring a surface pretreatment step(s), such as primer or chemical pretreatment, to improve adhesiveness, appearance (smoothness), and other properties of the coated resin surface. Thus the thermoplastic resin of the invention can provide painted products exhibiting excellent smoothness, adhesiveness, and the like without requiring resin surface pretreatment step(s).

Accordingly, the thermoplastic resin composition of the invention can provide environmental benefits and can decrease manufacturing costs by shortening the manufacturing process because the required level of paintability can be achieved without a surface pretreatment step (such as a primer-treating step) prior to coating.

In addition, the thermoplastic resin composition can have excellent impact resistance as well as an excellent balance of physical properties such as chemical resistance, polishing properties, and the like. The thermoplastic resin composition of the invention can further exhibit good moldability and mechanical strength.

In one exemplary embodiment, the thermoplastic resin composition may comprise about 100 parts by weight of a base resin comprising (A) about 10 to about 99 parts by weight of styrenic resin comprising an epoxy group and (B) about 1 to about 90 parts by weight of polyester resin; and (C) about 0.1 to about 97 parts by weight of an amorphous modified polyester resin based on the total weight of the base resin. The resin composition of the invention can exhibit improved compatibility between the styrenic resin and the polyester resin by introducing an epoxy group in the styrenic resin. In addition, the amorphous polyester resin can provide a good balance of various properties to the resin composition.

In another exemplary embodiment, the resin composition may comprise about 100 parts by weight of a base resin comprising (A) about 20 to about 99 parts by weight of styrenic resin comprising an epoxy group and (B) about 1 to about 80 parts by weight of polyester resin; and (C) about 0.5 to about 50 parts by weight of an amorphous modified polyester resin based on the total weight of the base resin.

In another exemplary embodiment, the resin composition may comprise about 100 parts by weight of a base resin comprising (A) about 50 to about 75 parts by weight of styrenic resin comprising an epoxy group and (B) about 25 to about 50 parts by weight of polyester resin; and (C) about 1 to about 10 parts by weight of an amorphous modified polyester resin based on the total weight of the base resin.

The styrenic resin comprising an epoxy group (A) may comprise ($A_1$) about 5 to about 100% by weight of a vinyl copolymer resin comprising an epoxy group and ($A_2$) about 0 to about 95% by weight of a rubber-reinforced styrenic copolymer resin.

In other exemplary embodiments, the vinyl copolymer resin comprising an epoxy group ($A_1$) may comprise ($A_{11}$) about 0.02 to about 5 mol % of an epoxy-based compound and ($A_{12}$) about 95 to about 99.98 mol % of a vinyl compound.

The epoxy-based compound ($A_{11}$) is exemplified by epoxy alkyl acrylate, allyl glycidyl ester, aryl glycidyl ester, glycidyl methacrylate, glycidyl acrylate, butadiene monoxide, vinyl glycidyl ether and glycidyl itaconate. These materials may be used singly or in combination.

The rubber-reinforced styrenic copolymer resin ($A_2$) may comprise ($A_{21}$) about 20 to about 100% by weight of graft-copolymer resin and ($A_{22}$) about 0 to about 80% by weight of copolymer resin.

The polyester resin (B) may have an intrinsic viscosity of about 0.3 to about 1.15 g/dl.

The amorphous modified polyester resin (C) may have an intrinsic viscosity of about 0.5 to about 1.0 g/dl.

The amorphous modified polyester resin (C) is a resin polymerized with acid components and diol components and can include 1,4-cyclohexanedimethanol.

In other exemplary embodiments, the amorphous modified polyester resin (C) may comprise about 20 to 60 mol % of 1,4-cyclohexanedimethanol based on the moles of acid components.

The thermoplastic resin composition of the present invention may further comprise one or more additives such as a surfactant, nucleating agent, coupling agent, charging material (filler), plasticizer, impact modifier, lubricant, antimicrobial agent, mold release agent, heat stabilizer, dispersant, anti-dripping agent, antioxidant agent, weather stabilizer, light stabilizer, compatibilizing agent, inorganic additive, antistatic agent, dye, pigment, flame retardant and the like, and combinations thereof.

In other exemplary embodiments, the thermoplastic resin composition may have an izod impact strength (ASTM D 256, on ⅛" thickness basis) of about 30 kgf·cm/cm or more for a specimen prepared by injection molding after drying at 80° C. for 3 hours and a peel strength of a film of paint (180° Peel Strength) of about 1,000 g/cm or more measured by an instron universal testing machine for a specimen prepared to measure paintability by coating the specimen with urethane paint at a thickness of 50 μm; drying at 90° C. for 30 minutes; and leaving at room temperature for 48 hours.

Another aspect of the present invention provides plastic molded products manufactured from the styrenic thermoplastic resin composition. The present invention can further provide a metal-deposited molded product with improved paintability using the styrenic thermoplastic resin composition.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Styrenic Resin Containing Epoxy Group

The styrenic resin comprising an epoxy group (A) of the present invention comprises a vinyl copolymer resin comprising an epoxy group and a rubber-reinforced styrenic copolymer resin. In exemplary embodiments, the styrenic thermoplastic resin comprising an epoxy group comprises ($A_1$) about 5 to about 100% by weight of a vinyl copolymer resin comprising an epoxy group and ($A_2$) about 0 to about 95% by weight of a rubber-reinforced styrenic copolymer resin. In other exemplary embodiments, the styrenic thermoplastic resin comprising an epoxy group may comprise ($A_1$) about 5 to about 50% by weight of a vinyl copolymer resin comprising an epoxy group and ($A_2$) about 50 to about 95% by weight of a rubber-reinforced styrenic copolymer resin. In other exemplary embodiments, the styrenic resin comprising an epoxy group may comprise ($A_1$) about 10 to about 40% by weight of a vinyl copolymer resin comprising an epoxy group and ($A_2$) about 60 to about 90% by weight of a rubber-reinforced styrenic copolymer resin.

In exemplary embodiments, the base resin can include the styrenic resin comprising an epoxy group in amount of about 10 to about 99 parts by weight. In other exemplary embodiments, the base resin can include the styrenic resin comprising an epoxy group in amount of about 40 to about 90 parts by weight or in amount of about 50 to about 85 parts by weight. In other exemplary embodiments, the base resin can include the styrenic resin comprising an epoxy group in amount of about 50 to about 75 parts by weight. The use of the styrenic resin comprising an epoxy group in these amounts can provide an optimum balance of physical properties such as excellent paintability as well as chemical resistance, impact resistance and hydrolysis resistance. In other exemplary embodiments, the styrenic resin comprising an epoxy group (A) may be used in amount of about 30 to about 40 parts by weight.

($A_1$) Vinyl Copolymer Resin Containing Epoxy Group

The vinyl copolymer resin comprising an epoxy group of the present invention can be synthesized by polymerization of monomers comprising about 0.02 to about 5 mol % of an epoxy-based compound ($A_{11}$) and about 95 to about 99.98 mol % of a vinyl compound ($A_{12}$).

($A_{11}$) Epoxy-Based Compound

The epoxy-based compound used in the styrenic thermoplastic resin comprising an epoxy group is an unsaturated epoxy-based compound represented by the following Chemical Formula 1:

[Chemical Formula 1]

wherein each of $R_1$, $R_2$, $R_3$, $R_6$, $R_7$ and $R_8$ independently comprises H, saturated or unsaturated $C_1$-$C_{12}$ alkyl, $C_6$-$C_{14}$ aryl, or saturated or unsaturated $C_1$-$C_{12}$ alkyl substituted $C_6$-$C_{14}$ aryl, Y is ether (—O—), carboxyl (—O—[C=O]—, —[O=C]—O—), $C_1$-$C_{12}$ alkylene, $C_6$-$C_{14}$ arylene or $C_1$-$C_{12}$ alkyl substituted $C_6$-$C_{14}$ arylene, and x is 0 or 1, wherein if Y is ether (—O—) or carboxyl (—O—[C=O]—, —[O=C]—O—), each $R_4$ and $R_5$ independently comprises $C_1$-$C_{12}$ alkylene, $C_6$-$C_{14}$ arylene or $C_1$-$C_{12}$ alkyl substituted $C_6$-$C_{14}$ arylene, and if Y is $C_1$-$C_{12}$ alkylene, $C_6$-$C_{14}$ arylene or $C_1$-$C_{12}$ alkyl substituted $C_6$-$C_{14}$ arylene, Y is represented by ($R_4$—Y—$R_5$).

Exemplary compounds of Formula I may include but are not limited to epoxy alkyl acrylate, allyl glycidyl ester, aryl glycidyl ester, glycidyl methacrylate, glycidyl acrylate, butadiene monoxide, vinyl glycidyl ether, glycidyl itaconate and the like, and combinations thereof.

When synthesizing the styrenic thermoplastic resin composition, the compound of Formula I may be added as a monomer of copolymerization in amount of about 0.02 to about 5 mol %, for example about 0.05 to about 5 mol %. The use of the compound of Formula I in these ranges can greatly improve impact resistance and substantially prevent or minimize a gellification phenomenon during extrusion molding. In other exemplary embodiments of the invention, the compound of Formula I may be added in an amount of about 0.1 to about 5.0 mol %, for example about 0.5 to about 5.0 mol %. In other exemplary embodiments, the unsaturated epoxy-based compound ($A_1$) may include the compound of Formula I in an amount of about 1 to about 5 mol %, for example about 3 to about 5 mol %.

($A_{12}$) Vinyl Compound

The vinyl compound used in the vinyl copolymer resin comprising an epoxy group may be an aromatic vinyl compound represented by the following Chemical Formula 2:

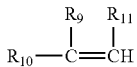

[Chemical Formula 2]

wherein each $R_9$ and $R_{11}$ independently comprises H or methyl, and $R_{10}$ is phenyl, halo substituted phenyl, $C_1$-$C_{12}$ alkyl substituted phenyl, $C_1$-$C_{12}$ alkyl halo phenyl, naphthalene or $C_1$-$C_{12}$ alkyl naphthalene.

In exemplary embodiments, the halo phenyl group is a phenyl group substituted by one to three halogen compounds, the $C_1$-$C_{12}$ alkyl phenyl group is a phenyl group substituted by one to two $C_1$-$C_{12}$ alkyl groups, the $C_1$-$C_{12}$ alkyl halo phenyl group is a phenyl group substituted by $C_1$-$C_{12}$ alkyl containing halogen compound or by both a halogen group and $C_1$-$C_{12}$ alkyl group. Optionally, $R_{10}$ is phenyl.

Exemplary aromatic vinyl compounds include without limitation styrene, ρ-tertiary butyl styrene, α-methyl styrene, β-methyl styrene, ρ-methyl styrene, ethyl styrene, vinyl xylene, monochloro styrene, dichloro styrene, dibromo styrene, vinyl naphthalene, and the like. These styrenic compounds may be used singly or in combination with one another or with other styrenic compounds.

Optionally other vinyl monomers may also be polymerized with the aromatic vinyl compound of Formula II, such as but not limited to cyanide vinyl compounds such as acrylonitrile, methacrylonitrile, ethacrylonitrile and the like, and combinations thereof.

The ratio of the aromatic vinyl compound and the optional vinyl monomer which can be polymerized with the aromatic vinyl compound can be determined by the compatibility thereof and the ratio of all of the monomers, excluding rubber, of the rubber-reinforced styrenic copolymer resin ($A_2$). In one exemplary embodiment, the vinyl compound ($A_{12}$) can include about 50 to about 100% by weight of the aromatic vinyl monomer and about 0 to about 50% by weight of the monomer which can be polymerized with the aromatic vinyl monomer. In other exemplary embodiments, about 60 to about 90% by weight of the aromatic vinyl monomer and about 10 to about 40% by weight of the monomer which can be polymerized with the aromatic vinyl monomer may be used. These ranges of amounts of aromatic vinyl monomer and optional monomer copolymerizable therewith can provide good processability and strength.

In exemplary embodiments, the properties of the copolymer may be improved by addition of ethylene-based unsaturated monomers to the vinyl compound ($A_{12}$) of the present invention. Exemplary ethylene-based unsaturated monomers may include without limitation $C_{1-4}$ alkyl (meth)acrylates such as methyl methacrylate, aryl (meth)acrylates such as phenyl acrylate, phenyl methacrylate, benzyl acrylate, benzyl methacrylate, 2-phenyl ethyl acrylate, 2-phenyl ethyl methacrylate, 2-phenoxy ethyl acrylate and 2-phenoxy ethyl methacrylate; N-substituted maleimide such as N-methyl, N-ethyl, N-phenyl and N-cyclohexyl maleimide; acrylic, methacrylic and carboxylic acid such as maleic acid, fumaric acid, itaconic acid and anhydrides thereof; and nitrogen-activity monomers such as dimethyl amino ethyl acrylate, diethyl amino ethyl acrylate, vinyl imidazole, vinyl pyrrolidone, vinyl caprolactam, vinyl carbazole, vinyl aniline, acryl amide and methacryl amide; and the like; and combinations thereof. The monomers may be added in amount of about 0 to about 30% by weight, for example about 1 to about 20% by weight, and as another example about 2 to about 15% by weight, based on the entire weight of the vinyl compound ($A_{12}$).

In the present invention, vinyl copolymer resin composition ($A_1$) includes the vinyl compound ($A_{12}$) in an amount of about 95 to about 99.98 mol % in the form of monomer.

($A_2$) Rubber-Reinforced Styrenic Copolymer Resin.

The rubber-reinforced styrenic copolymer resin is a resin including particle shaped rubbery polymer dispersed in a matrix polymer (continuous phase) comprising an aromatic vinyl polymer. The rubber-reinforced styrenic copolymer resin can be synthesized by polymerization of rubbery polymer, aromatic vinyl monomer and, optionally according to needs, a monomer which can be copolymerized with the aromatic vinyl monomer. The rubber-reinforced styrenic copolymer resin can be synthesized by known polymerization processes such as emulsion polymerization, suspension polymerization and bulk polymerization and generally can be synthesized by extrusion mixing of a graft-copolymer resin and a copolymer resin. The rubber-reinforced styrenic copolymer resin can also be synthesized by a bulk polymerization method using a one-step reaction without separately synthesizing the graft-copolymer resin and the copolymer resin. Regardless of the polymerization method used, the rubber content can be about 5 to about 30% by weight in the final rubber-reinforced styrenic copolymer resin ($A_2$).

In the present invention, the Z-average particle size of the rubber-phase can range from about 0.1 to about 6.0 μm, for example about 0.25 to about 3.5 μm, to provide the desired physical properties in the alloy or blend of the rubber-reinforced styrenic copolymer resin with the polyester resin.

The rubber-reinforced styrenic copolymer resin in the present invention can be synthesized using the graft-copolymer resin alone or using the graft-copolymer resin and the copolymer resin together and the compatibility of each resin should be considered when the resins are mixed.

Exemplary rubber-reinforced styrenic copolymer resins ($A_2$) useful in the present invention can include without limitation acrylonitrile-butadiene-styrene copolymer resin (ABS resin), acrylonitrile-ethylene propylene rubber-styrene copolymer resin (AES resin), acrylonitrile-acrylic rubber-styrene copolymer resin (AAS resin), and the like, and combinations thereof.

In one exemplary embodiment, the rubber-reinforced styrenic copolymer resin ($A_2$) in the present invention may comprise about 20 to about 100% by weight of the graft-copolymer resin ($A_{21}$) and about 0 to about 80% by weight of the copolymer resin ($A_{22}$). In other exemplary embodiments, the rubber-reinforced styrenic copolymer resin ($A_2$) may comprise about 50 to about 95% by weight of the graft-copolymer resin ($A_{21}$) and about 5 to about 50% by weight of the copolymer resin ($A_{22}$).

($A_{21}$) Graft-Copolymer Resin

The graft-copolymer resin ($A_{21}$) of the present invention can be prepared by graft polymerization of rubber-phase polymer, aromatic vinyl monomer, a monomer which can be copolymerized with the aromatic vinyl monomer and optionally a monomer to improve processability and heat resistance of the resin.

Exemplary rubber-phase polymers can include without limitation diene-based rubbers such as polybutadiene, poly(styrene-butadiene), and poly(acrylonitrile-butadiene); saturated rubbers in which hydrogen is added to a diene-based rubber; isoprene rubber; acrylic rubbers such as polybutyl acrylate; terpolymers of ethylene-propylene-diene monomers (EPDM); and the like, and combinations thereof.

The rubber-phase polymer can be used in amount of about 5 to about 65 parts by weight, based on the entire weight of the graft-copolymer resin ($A_{21}$).

The rubber particles can have an average size of about 0.1 to about 4 μm taking into account the desired impact strength and appearance of the end product.

Exemplary aromatic vinyl monomers may include without limitation styrene, α-methyl styrene, β-methyl styrene, ρ-methyl styrene, ρ-tertiary butyl styrene, ethyl styrene, vinyl xylene, monochloro styrene, dichloro styrene, dibromo styrene, vinyl naphthalene and the like, and combinations thereof. The aromatic vinyl monomer can be used in an amount of about 30 to about 95 parts by weight, based on the entire weight of the graft-copolymer resin ($A_{21}$).

The graft-copolymer resin ($A_{21}$) of the present invention may further include one or more kinds of monomers which can be copolymerized with the aromatic vinyl monomer. Exemplary monomers which may be added to the graft-copolymer resin can include without limitation cyanide vinyl compounds such as acrylonitrile, ethacrylonitrile, methacrylonitrile, and the like, and combinations thereof. The monomer copolymerized with the aromatic vinyl monomer can be used in an amount of about 1 to about 20 parts by weight, based on the entire weight of the graft-copolymer resin ($A_{21}$).

Exemplary monomers which can improve processability and heat resistance of the resin can include without limitation acrylic acid, methacrylic acid, maleic anhydride, N-substituted maleimide and the like, and combinations thereof. These monomers may be used in amount of about 0 to about 15 parts by weight, based on the entire weight of the graft-copolymer resin ($A_{21}$).

($A_{22}$) Copolymer Resin

The copolymer resin ($A_{22}$) of the present invention can be prepared based on the compatibility and the ratio of all of the monomers (excluding rubber) used for the graft-copolymer resin ($A_{21}$) and can be prepared by copolymerization of aromatic vinyl monomer, monomer which can be copolymerized with the aromatic vinyl monomer and optionally monomer which improve processability and heat resistance of the resin.

Exemplary aromatic vinyl monomers may include without limitation styrene, α-methyl styrene, β-methyl styrene, ρ-methyl styrene, ρ-tertiary butyl styrene, ethyl styrene, vinyl xylene, monochloro styrene, dichloro styrene, dibromo styrene, vinyl naphthalene and the like, and combinations thereof. In exemplary embodiments, the aromatic vinyl monomer may be used in amount of about 60 to about 90 parts by weight, based on the entire weight of the copolymer resin ($A_{22}$).

Exemplary monomers which can be copolymerized with the aromatic vinyl monomer can include without limitation cyanide vinyl compounds such as acrylonitrile, ethacrylonitrile and methacrylonitrile, and the like, and combinations thereof. The amount of the monomer which can be copolymerized with the aromatic vinyl monomer used is about 10 to about 40 parts by weight, based on the entire weight of the copolymer resin ($A_{22}$).

Exemplary monomers which can improve processability and heat resistance of the resin can include without limitation acrylic acid, methacrylic acid, maleic anhydride, N-substituted maleimide and the like, and combinations thereof. Such monomers may be used in an amount of about 0 to about 30 parts by weight, based on the entire weight of the copolymer resin ($A_{22}$).

(B) Polyester Resin

The polyester resin used in the present invention is crystalline, can be a homopolymer or copolymer, and can have an intrinsic viscosity of about 0.3 to about 1.15 g/dl. In the exemplary embodiments, the polyester resin can have an intrinsic viscosity of about 0.5 to about 1.0 g/dl.

The polyester resin can be prepared by polycondensation of aromatic dicarboxylic acid or its ester with diol having 2 to 12 carbon atoms. This polycondensation process is well known in the art and can be readily performed by a person of ordinary skill in the art.

Exemplary aromatic dicarboxylic acids or esters thereof can include without limitation terephthalic acid (TPA), isophthalic acid (IPA), 1,2-naphtalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalene dicarboxylic acid, dimethyl terephthalate (DMT) which is an aromatic dicarboxylate in which an acid is substituted by a dimethyl group, dimethyl isophthalate, alkyl ester of naphthalene dicarboxylic acid, dimethyl-1,2-naphthalate, dimethyl-1,5-naphthalate, dimethyl-1,7-naphthalate, dimethyl-1,8-naphthalate, dimethyl-2,3-naphthalate, dimethyl-2,6-naphthalate, dimethyl-2,7-naphthalate, and the like, and combinations thereof.

Exemplary diols having 2 to 12 carbon atoms can include without limitation ethylene glycol, 1,2-propylene glycol, 1,3-propylene glycol, 2,2-dimethyl-1,3-propanediol, 2,2-dimethyl-1,3-propylene glycol, 1,3-butanediol, 1,4-butanediol, 1,5-pentanediol, 1,6-hexanediol, 1,3-cyclohexane dimethanol, 1,4-cyclohexane dimethanol, and the like, and combinations thereof.

The polyester may be mixed with inorganic particles using conventional techniques, depending on the end use of the resin. Exemplary inorganic particles can include without limitation titanium dioxide ($TiO_2$), silicon dioxide ($SiO_2$), aluminum hydroxide ($Al(OH)_2$), and the like, and combinations thereof. The polyester resin can include inorganic particles in an amount of about 0.1 to about 30 parts by weight, based on about 100 parts by weight of the polyester resin.

In the present invention, the base resin includes the polyester resin in amount of about 1 to about 90 parts by weight. If the polyester resin is used in an amount less than about 1 part by weight, it can be difficult to achieve excellent impact resistance and paintability. If the polyester resin is used in an amount greater than about 90 parts by weight, the resultant product can exhibit a poor balance of physical properties. In exemplary embodiments, the polyester resin may be used in amount of about 1 to about 80 parts by weight, for example about 5 to about 50 parts by weight. In other exemplary embodiments, the polyester resin may be used in amount of about 10 to about 45 parts by weight, for example about 20 to about 40 parts by weight.

(C) Amorphous Modified Polyester Resin

In the present invention, the amorphous modified polyester resin is not crystalline and may have an intrinsic viscosity of about 0.5 to about 1.0 g/dl. In exemplary embodiments, the amorphous modified polyester resin can have an intrinsic viscosity of about 0.6 to about 0.8 g/dl.

The amorphous modified polyester resin can be prepared by polymerization of acid components and diol components. Exemplary acid components may include without limitation aromatic dicarboxylic acids such as terephthalic acid, isophthalic acid, 4,4-diphenyl dicarboxylic acid, 4,4-diphenoxy ethane dicarboxylic acid, 4,4-diphenyl sulfone dicarboxylic acid and structural isomers thereof; aliphatic dicarboxylic acids such as malonic acid, succinic acid and adipic acid; oxygen containing acids and derivatives thereof such as hydroxyl benzoic acid, hydroxyl bezoate and glycolic acid; and the like; and combinations thereof.

Exemplary diol components can include without limitation ethylene glycol, 1,4-cyclohexane dimethanol, 1,3-propanediol, 1,4-butanediol, pentamethylene glycol, hexamethylene glycol, neopentyl glycol, cyclohexane dimethanol, diethylene glycol, derivatives of aromatic dihydroxy compounds such as bisphenol A and bisphenol S and the like, and combinations thereof. At least one diol component can be a cycloaliphatic diol, such as 1,4-cyclohexanediol cycloaliphatic diol.

In exemplary embodiments, the amorphous modified polyester resin can be prepared by polymerization of acid components and diol components, wherein at least one diol component can optionally be 1,4-cyclohexanedimethanol.

In exemplary embodiments of the present invention, the amorphous modified polyester resin may be a copolymer of about 10 to about 80 mol % of cycloaliphatic diol; about 10 to about 80 mol % of aromatic dicarboxylic acid; and about 10 to 80 mol % of $C_{2-5}$ alkylene glycol.

In exemplary embodiments, the amorphous modified polyester resin can be a copolymer of 1,4-cyclohexanedimethanol, terephthalic acid and ethylene glycol. 1,4-cyclohexanedimethanol can be used in amount of about 0.1 to about 99 mol %, for example about 20 to about 60 mol % based on the moles of the acid component. In exemplary embodiments, 1,4-cyclohexanedimethanol may be included in amount of about 25 to about 50 mol % of the entire amorphous modified polyester resin (C).

Optionally, a glycol-modified polyethylene terephthalate (PETG) may be used as the amorphous modified polyester resin.

In the present invention, the amorphous modified polyester resin (C) may be used in amount of about 0.1 to about 97 parts by weight, based on the total weight of the base resin. If the amorphous modified polyester resin is used in an amount less than about 0.1 parts by weight, it can be difficult to achieve excellent impact resistance and paintability. If the amorphous modified polyester resin is used in an amount greater than about 97 parts by weight, the resultant product can exhibit a poor balance of physical properties as well as poor chemical resistance. To improve impact resistance and paintability, the amorphous modified polyester resin may be used in amount of about 0.5 to about 50 parts by weight, for example about 1 to about 35 parts by weight, and as another example about 1 to about 10 parts by weight, based on the total weight of the base resin. In other exemplary embodiments, the amorphous modified polyester resin (C) may be used in amount of about 1 to about 5 parts by weight based on the total weight of the base resin, and in yet other exemplary embodiments, the amorphous modified polyester resin (C) may be used in amount of about 5 to about 30 parts by weight, based on the total weight of the base resin.

The thermoplastic resin composition of the present invention may further comprise additives such as one or more surfactants, nucleating agents, coupling agents, charging materials (fillers), plasticizers, impact modifiers, lubricants, antimicrobial agents, mold release agents, heat stabilizers, dispersants, anti-dripping agents, antioxidant agents, weather stabilizers, light stabilizers, compatibilizing agents, inorganic additives, antistatic agents, dyes, pigments, flame retardants, and the like, and combinations thereof, according to the respective purposes.

In exemplary embodiments, the thermoplastic resin composition of the present invention can have excellent paintability as exemplified by a peel strength of a film of paint (180° Peel Strength) of 1,000 g/cm, for example about 1,100 g/cm or more, measured by an instron universal testing machine when testing a specimen prepared for measuring paintability having a width of 1 cm and a length of 15 cm of length) which is prepared by the steps of being by coating the specimen with urethane paint of second liquid-type manufactured by AEKYUNG PNC Ltd. having a thickness of 50 µm; drying at 90° C. for 30 hours; and leaving at room temperature for 48 hours, without pre-treatment. In exemplary embodiments, the peel strength of the film of paint (180° Peel Strength) may be about 1200 to about 1500 g/cm.

The thermoplastic resin composition of the present invention may have an izod impact strength (ASTM D 256, on 1/8" thickness basis) of about 30 kgf·cm/cm or more when testing a specimen prepared by injection molding after drying at 80° C. for 3 hours. In exemplary embodiments, the izod impact strength (ASTM D 256, on 1/8" thickness basis) may be about 32 to about 60 kgf cm/cm.

Another aspect of the present invention provides plastic molded products manufactured from the styrenic thermoplastic resin composition.

The plastic molded products may be manufactured using known processes into various forms. For examples, after mixing the components of the present invention and optionally mixing other additives together, the mixture can be melted and extruded into pellet form using conventional extrusion equipment, and the pellets can be injection or extrusion molded to form various molded products.

The styrenic thermoplastic resin composition of the present invention can have excellent impact resistance and paintability so that it can be molded to form a housing material for an automobile, as well as various electric and electronic goods needing painting or coating process. For example, it can be molded as an injected-exterior construction material for an automobile or automobile parts such as a housing for an automobile back-ramp, bezel of an automobile head-ramp and electric and electronic goods such as televisions, washing machines, computers, audio players, video players, CD players, cellular phones, telephones, and the like.

The surface of the above molded products may be coated, gilded or deposited with metals using a known process. The surface of molded products may be coated entirely or partially according to the need. Exemplary metals for the coating, gilding or depositing can include without limitation aluminum, chromium, silver, gold, platinum, nickel, copper, zinc, and the like, and combinations thereof.

EXAMPLES (A) Styrenic Resin Containing Epoxy Group (A₁) Vinyl Copolymer Resin Containing Epoxy Group (GMA 5 mol %—SAN)

A styrene-acrylonitrile copolymer resin including an epoxy group (GMA-SAN) is synthesized by mixing 120 parts by weight deionized water and 100 parts by weight of a mixture of monomers including 5 mol % glycidyl methacrylate and 95 mol % vinyl compound ($A_{12}$) which comprises 70 parts by weight styrene and 30 parts by weight acrylonitrile; adding 0.2 parts by weight azo-bis-isobutyronitrile, 0.4 parts by weight tricalcium phosphate and 0.2 parts by weight mercaptan-based chain transfer agent to the above mixture; raising the temperature from room temperature to 80° C. for 60 minutes; and maintaining at this temperature for 180 minutes. The product is washed, dehydrated and dried to provide the styrene-acrylonitrile copolymer resin including an epoxy group (GMA-SAN) in powder form.

($A_2$) Rubber-Reinforced Styrenic Copolymer Resin ($A_{21}$) Graft Copolymer Resin A latex of a graft copolymer (g-ABS) is synthesized by mixing 50 parts by weight solids of butadiene rubber latex, 36 parts by weight styrene, 14 parts by weight acrylonitrile monomer which can be graft-copolymerized and 150 parts by weight deionized water; adding 1.0 parts by weight potassium oleate, 0.4 parts by weight cumene hydroperoxide, 0.2 parts by weight mercaptan-based chain transfer agent, 0.4 parts by weight glucose and 0.3 parts by weight sodium salt of pyrophosphate against the total solids of the above mixture; and keeping at a temperature of 75° C. for 5 hours to complete the reaction. Then sulfonic acid in amount of 0.4 parts by weight against the solids of the above resulting resin composition is added and coagulated to synthesize the graft copolymer (g-ABS) in powder form.

($A_{22}$) Copolymer Resin

A styrene-acrylonitrile copolymer resin (SAN) is synthesized by mixing 75 parts by weight styrene, 25 parts by weight acrylonitrile and 120 parts by weight deionized water; adding 0.2 parts by weight azo-bis-isobutyronitrile, 0.4 parts by weight tricalcium phosphate and 0.2 parts by weight mercaptan-based chain transfer agent to the above mixture; raising the temperature from room temperature to 80° C. for 90 minutes; and maintaining at this temperature for 180 minutes. The product is washed, dehydrated and dried to form a powder of the styrene-acrylonitrile copolymer resin (SAN).

(B) Polyester Resin ($B_1$) A product with the trade name A1100 manufactured by Anychem Ltd. is used as the polyester resin having intrinsic viscosity of 0.76 g/dL.

($B_2$) A product with the name Clear PET Flake manufactured by Samyang Ltd. is used as a recycled polyester resin having intrinsic viscosity of 0.72 g/dL.

(C) Amorphous Modified Polyester Resin.

A product with the name SKYGREEN S2008 (PETG) with an intrinsic viscosity of 0.8 g/dL and CHDM content of 25% manufactured by SK Chemical Ltd. is used.

Examples 1-6

For Examples 1 to 6, the components as shown in Table 1 are mixed and mingled evenly for 3 to 10 minutes in a Hensel mixer. Then this mixture is extruded into pellets using a conventional twin screw extruder at an extrusion temperature of 180 to 280° C., a rotation velocity of the screw of 150 to 300 rpm and a feed rate of 30 to 60 kg/hr. The resin pellets are dried for 3 hours at a temperature of 80° C., and then are molded into a test specimen using a 6 oz injection molding machine at a molding temperature of 180 to 280° C. and a mold temperature of 40 to 80° C. After exposing the specimens to a temperature of 23° C. and 50% relative humidity for 40 hours, the physical properties and the paintability of the respective test specimens are measured as follows, and the results are set forth in Table 1 below.

Comparative Examples 1-4

Comparative Examples 1 to 4 are prepared in the same manner as the above Examples 1 to 6 except using the components shown in Table 1.

The physical properties of the test specimens prepared in the Comparative Examples are also measured as follows, and the results are set forth in Table 1 below.

(1) Impact strength: The notch impact strength of the specimens is measured in accordance with ASTM D 256. The final test result is calculated by the average of 5 test results (⅛" kgf·cm/cm).

(2) Measurement of fluid flux in mold: The length (cm) of molded material is measured after injection to a spiral-shape mold using a 6 oz injection molding machine with a molding temperature of 250° C., mold temperature of 60° C., injection pressure of 50% and injection ratio of 70%.

(3) Paint adhesion ability: The specimen is prepared without pre-treatment by coating with urethane paint of second liquid-type manufactured by AEKYUNG PNC Ltd to a thickness of 50 μm; drying at 90° C. for 30 hours; and leaving at room temperature for 48 hours. After cutting this specimen to 1 cm width and 15 cm length, the peel strength of the film of paint (180° Peel Strength) for the paintability test is measured using an instron universal testing machine.

(4) Moldability: The moldability is estimated by the surface-flatness of the rear-side of resin when molded by the steps of: heating the rectangular electroforming mold of 20 cm×20 cm consisting of nickel and silicon resin for 30 minutes in an oven at 400° C.; freezing and pulverizing the composition of Table 1 to form a powder; and spraying the powder onto the surface.

TABLE 1

|  |  | Examples | | | | | | Comparative Examples | | | |
|---|---|---|---|---|---|---|---|---|---|---|---|
|  |  | 1 | 2 | 3 | 4 | 5 | 6 | 1 | 2 | 3 | 4 |
| Styrenic resin containing epoxy group (A) | A1 | 15 | 15 | 15 | 15 | 20 | 10 | — | — | — | 15 |
|  | A21 | 25 | 25 | 25 | 25 | 25 | 20 | 70 | 30 | 30 | 25 |
|  | A22 | 20 | 20 | 20 | 20 | 25 | 20 | 30 | 30 | 30 | 20 |
| Polyester resin (B) | B1 | 40 | 40 | 40 | — | 30 | 50 | — | 40 | 40 | 40 |
|  | B2 | — | — | — | 40 | — | — | — | — | — | — |
| Amorphous modified polyester resin (C) |  | 1 | 3 | 5 | 1 | 5 | 10 | — | 1 | 3 | — |
| Heat stabilizer |  | 0.3 | 0.3 | 0.3 | 0.3 | 0.3 | 0.3 | 0.3 | 0.3 | 0.3 | 0.3 |
| Impact strength |  | 33 | 36 | 43 | 32 | 41 | 48 | 24 | 23 | 25 | 27 |
| Measurement of fluid flux in mold |  | 43 | 47 | 49 | 44 | 49 | 49 | 50 | 47 | 47 | 41 |

TABLE 1-continued

|  | Examples | | | | | | Comparative Examples | | | |
| --- | --- | --- | --- | --- | --- | --- | --- | --- | --- | --- |
|  | 1 | 2 | 3 | 4 | 5 | 6 | 1 | 2 | 3 | 4 |
| Moldability | good | good | good | good | good | good | fair | good | good | good |
| Peel strength of the film of paint (g/cm) | 1,200 | 1,245 | 1,310 | 1,210 | 1,180 | 1,440 | 457 | 775 | 835 | 880 |

As shown in Table 1, the thermoplastic resin composition from Examples 1-6 shows excellent mechanical physical properties and moldability. In contrast, Comparative Examples 1-3 which do not include a styrenic resin containing an epoxy group (A) show deterioration of impact strength and peel strength. Moreover, Comparative Example 4 which does not include an amorphous modified polyester resin shows deterioration of overall physical properties such as impact strength, fluid flux, and impact strength, among others.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A styrenic thermoplastic resin composition having excellent impact resistance and paintability, comprising:
about 100 parts by weight of a binary base resin comprising (A) about 10 to about 99 parts by weight of styrenic resin comprising an epoxy group and (B) about 1 to about 90 parts by weight of polyester resin; wherein said styrenic resin comprising an epoxy group (A) comprises ($A_1$) about 5 to about 50% by weight of a vinyl copolymer resin comprising an epoxy group and ($A_2$) about 50 to about 95% by weight of a rubber-reinforced styrenic copolymer resin; and
(C) about 0.1 to about 97 parts by weight of amorphous modified polyester resin based on the total weight of the base resin.

2. The styrenic thermoplastic resin composition having excellent impact resistance and paintability of claim 1, wherein said vinyl copolymer resin comprising an epoxy group ($A_1$) is a copolymer of ($A_{11}$) about 0.02 to about 5 mol % of an epoxy-based compound and ($A_{12}$) about 95 to about 99.98 mol % of a vinyl compound.

3. The styrenic thermoplastic resin composition having excellent impact resistance and paintability of claim 2, wherein said epoxy-based compound ($A_{11}$) is represented by the following Chemical Formula 1:

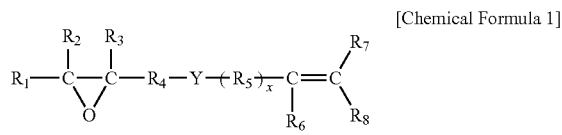

[Chemical Formula 1]

wherein each of $R_1$, $R_2$, $R_3$, $R_6$, $R_7$ and $R_8$ independently comprises H, saturated or unsaturated $C_1$-$C_{12}$ alkyl, $C_6$-$C_{14}$ aryl, or saturated or unsaturated $C_1$-$C_{12}$ alkyl substituted $C_6$-$C_{14}$ aryl, Y is ether (—O—), carboxyl (—O—[C=O]—, —[O=C]—O—), $C_1$-$C_{12}$ alkylene, $C_6$-$C_{14}$ arylene or $C_1$-$C_{12}$ alkyl substituted $C_6$-$C_{14}$ arylene, and
x is 0 or 1
wherein if Y is ether (—O—) or carboxyl (—O—[C=O]—, —[O=C]—O—), $R_4$ and $R_5$ independently comprise $C_1$-$C_{12}$ alkylene, $C_6$-$C_{14}$ arylene or $C_1$-$C_{12}$ alkyl substituted $C_6$-$C_{14}$ arylene,
and if Y is $C_1$-$C_{12}$ alkylene, $C_6$-$C_{14}$ arylene or $C_1$-$C_{12}$ alkyl substituted $C_6$-$C_{14}$ arylene, Y is represented by ($R_4$—Y—$R_5$).

4. The styrenic thermoplastic resin composition having excellent impact resistance and paintability of claim 3, wherein said epoxy-based compound ($A_{11}$) comprises epoxy alkyl acrylate, allyl glycidyl ester, aryl glycidyl ester, glycidyl methacrylate, glycidyl acrylate, butadiene monoxide, vinyl glycidyl ether, glycidyl itaconate or a combination thereof.

5. The styrenic thermoplastic resin composition having excellent impact resistance and paintability of claim 1, wherein said rubber-reinforced styrenic copolymer resin ($A_2$) comprises ($A_{21}$) about 20 to about 100% by weight of a graft copolymer resin and ($A_{22}$) about 0 to about 80% by weight of a copolymer resin.

6. The styrenic thermoplastic resin composition having excellent impact resistance and paintability of claim 1, wherein said polyester resin (B) has an intrinsic viscosity of about 0.3 to about 1.15 g/dl.

7. The styrenic thermoplastic resin composition having excellent impact resistance and paintability of claim 1, wherein said amorphous modified polyester resin (C) has intrinsic viscosity of about 0.5 to about 1.0 g/dl.

8. The styrenic thermoplastic resin composition having excellent impact resistance and paintability of claim 1, wherein said amorphous modified polyester resin (C) is prepared by polymerization of acid components and diol components, and the diol components comprise 1,4-cyclohexane dimethanol.

9. The styrenic thermoplastic resin composition having excellent impact resistance and paintability of claim 8, wherein the 1,4-cyclohexane dimethanol is provided in an amount of about 0.1 to about 99 mol % based on the moles of the acid components.

10. The styrenic thermoplastic resin composition having excellent impact resistance and paintability of claim 9, wherein the 1,4-cyclohexane dimethanol is provided in an amount of about 20 to about 60 mol % based on the moles of the acid components.

11. The styrenic thermoplastic resin composition having excellent impact resistance and paintability of claim 1, wherein said resin composition comprises:
about 100 parts by weight of said binary base resin comprising (A) about 50 to about 75% by weight of said styrenic resin comprising an epoxy group and (B) about 25 to about 50% by weight of said polyester resin; and
(C) about 1 to about 10 parts by weight of said amorphous modified polyester resin, based on the total weight of the base resin.

12. The styrenic thermoplastic resin composition having excellent impact resistance and paintability of claim 1, further comprising an additive selected from surfactants, nucleating agents, coupling agents, charging materials, plasticizers, impact modifiers, lubricants, antimicrobial agents, mold release agents, heat stabilizers, dispersants, anti-dripping agents, antioxidant agents, weather stabilizers, light stabilizers, compatibilizing agents, inorganic additives, antistatic agents, dyes, pigments, flame retardants or a combination thereof.

13. The styrenic thermoplastic resin composition of claim 1, wherein said resin composition has an izod impact strength (ASTM D 256, 1/8" thickness basis) of about 30 kgf·cm/cm or more when testing a specimen prepared by injection molding after drying at 80° C. for 30 minutes and has a peel strength of a film of paint (180° Peel Strength) of 1,000 g/cm or more measured by an instron universal testing machine for a specimen prepared for measuring paintability by coating the specimen with urethane paint to a thickness of 50 μm; drying at 90° C. for 30 minutes; and leaving at room temperature for 48 hours.

14. The styrenic thermoplastic resin composition having excellent impact resistance and paintability of claim 1, wherein (B) is a crystalline polyester resin.

15. The styrenic thermoplastic resin composition having excellent impact resistance and paintability of claim 14, comprising (C) about 0.1 to about 10 parts by weight of amorphous modified polyester resin based on the total weight of the base resin.

16. The styrenic thermoplastic resin composition having excellent impact resistance and paintability of claim 14, comprising (B) about 1 to about 50 parts by weight of crystalline polyester resin.

17. A molded article produced from the styrenic thermoplastic resin composition as defined in claim 1.

* * * * *